United States Patent
Irwin

[19]

[11] Patent Number: 6,052,683
[45] Date of Patent: Apr. 18, 2000

[54] ADDRESS LOOKUP IN PACKET DATA COMMUNICATION NETWORKS

[75] Inventor: George Frank Irwin, Kanata, Canada

[73] Assignee: Nortel Networks Corporation, Montreal, Canada

[21] Appl. No.: 09/028,506

[22] Filed: Feb. 24, 1998

[51] Int. Cl.[7] .................................................. G06F 17/00
[52] U.S. Cl. ........................... 707/8; 707/6; 707/7; 707/9
[58] Field of Search ................. 707/1–536; 341/51–106; 704/9–10

[56] References Cited

U.S. PATENT DOCUMENTS

| | | | |
|---|---|---|---|
| 5,229,936 | 7/1993 | Decker et al. .............................. | 704/10 |
| 5,281,967 | 1/1994 | Jung ......................................... | 341/55 |
| 5,386,413 | 1/1995 | McAuley et al. .......................... | 370/54 |
| 5,414,704 | 5/1995 | Spinney ..................................... | 370/60 |
| 5,488,608 | 1/1996 | Flammer, III ......................... | 370/85.13 |
| 5,525,982 | 6/1996 | Cheng et al. .............................. | 341/51 |
| 5,561,421 | 10/1996 | Smith et al. ............................... | 341/51 |
| 5,794,177 | 8/1998 | Carus et al. ............................. | 707/532 |
| 5,890,103 | 3/1999 | Carus ...................................... | 707/531 |

OTHER PUBLICATIONS

Degermark, Mikael et al., Smalls Forwarding Tables for Fast Routing Lookups, Department of Computer Science and Electrical Engineering, Luleå University of Technology, S–971 87 Luleå, Sweden, no date.

Waldvogel, Marcel et al., Scalabe High Speed IP Routing Lookups, Computer Engineering and Networks Laboratory, ETH Zürich, Switzerland; Computer and Communications Research Center, Washington University in St. Louis, USA, no date.

*Primary Examiner*—Thomas G. Black
*Assistant Examiner*—David Jung
*Attorney, Agent, or Firm*—Max R. Wood

[57] ABSTRACT

An apparatus for performing an address lookup to find a longest matching prefix for an N-bit input address in a packet data communication system that includes a memory (e.g. RAM) for storing a table containing a predefined portion of an N-bit address with an associated prefix search list containing prefix values that are candidates for the longest matching prefix. A binary search algorithm is used for selecting a specific prefix value from the prefix search list to structure the N-bit input address to form a search value. A search algorithm (e.g. a content addressable memory) is used for performing an associative search on the search value to find the longest matching prefix. The two types of memories (RAM and CAM) each provide specific functions. The RAM is used as a lookup table to provide an N/x-bit (0<x<N) binary decoding tree, and the CAM is used to provide an associative search of network addresses that are stored in logical bins that have a specific network prefix. By using the binary search algorithm that is guided by the lookup table data, the CAM can be probed to find the longest matching prefix.

26 Claims, 7 Drawing Sheets

ADDRESS LOOKUP IN PACKET DATA COMMUNICATION NETWORKS

FIELD OF THE INVENTION

This invention relates to the field of address translation as used in packet data communication networks, and more particularly to an apparatus and a method for performing a longest matching prefix search of a network address for an N-bit input address in a packet data communication system.

BACKGROUND OF THE INVENTION

In a packet data communications network (Internet, Ethernet, token ring, and the like) address translation is an integral component of the system. In particular, there is a requirement of doing source and destination address lookups.

Using the Internet as a basis for discussion, three main factors contribute to the speed of traffic over the Internet: link speeds, router data throughput, and packet forwarding rates. Readily available solutions exist for the first two factors. For example, fiber-optics can provide faster links and switching technology can be used to move packets through a router at gigabit speeds. The present invention deals with the third factor, packet forwarding. The main step in packet forwarding is to lookup the destination address of an incoming packet in a routing database. Internet routers search a database for the longest prefix matching a destination IP address. Traditional techniques for exact matching, such as perfect hashing, binary search, and standard content addressable memories (CAM) cannot directly be used for effective Internet address lookups. In particular, perfect hashing and binary search can be used for IP lookups, but typically require several microseconds per lookup; and CAM based solutions are considered to be expensive since multiple CAMs operating in parallel need to be used (i.e. one CAM for each prefix bin).

A forwarding database in an IP router consists of a number of variable length network addresses. The length of the network address is given by a prefix value. When an IP router receives a packet, it must compute which of the network addresses in its database has the longest match when compared to the destination address in the packet. The packet is then forwarded to the output link associated with that prefix. For example, a forwarding database may have the following network addresses (NA): NA1=0101, NA2=0101101 and NA3=010110101011. In this example the destination address is 16-bits long, the corresponding prefix values defines the network portion of the destination address: P1=1111000000000000, P2=1111111000000000 and P3=1111111111110000. An address whose first 12 bits are 010101101011 has longest matching prefix P1. An address whose first 12 bits are 010110101101 has longest matching prefix P3.

To solve the longest matching prefix problem, a routing table can be implemented using a large memory array to provide a 32-bit binary decoding tree. With a tree depth of 32, a unique decode is available for each possible IP address. Since the network portion of the address is less than 32 bits, the decoding of the network address is internal to the memory decoding structure, consequently an internal decode level defined by a network address results in a range of decoded 32-bit addresses that may be associated with the given network address.

From a routing perspective, each network address internal to the memory defines a range of IP addresses that are routed in the same manner. With a plurality of network addresses being located internal to the memory, there will be instances in which two or more network addresses share the same IP address, the network address selected will be the one that is lowest down the decoding chain.

A decoding tree with a depth of 32 results in 4,300 million IP addresses and requires an excessively large memory that uses only one memory access. Since the number of network addresses used by a router located within the backbone of the Internet typically requires 40,000 entries, the routing table can be reduced to a compact forwarding table using significantly less memory. Existing solutions such as (1) algorithms for best matching prefix using binary search on hash tables organized by prefix lengths (described in *Scalable High Speed IP Routing Lookups*, Waldvogel et al., http://www.tik.ee.ethz.ch/tik/research/Research.html) and (2) using a forwarding table data structure designed for quick routing lookups (described in *Small Forwarding Tables for Fast Routing Lookups*, Degermark et al., http://www.cdt.luth.se/net/publications.html) typically increase the number of memory accesses to reduce the physical size of the data structure while increasing the functional complexity for forwarding lookups. This functional complexity directly affects the ability to provide a simple method of inserting or deleting connection entries from the forwarding solutions.

SUMMARY OF THE INVENTION

An object of the present invention is to provide an apparatus and a method for performing a longest matching prefix search of a network address for an N-bit input address in a packet data communication network.

In accordance with one aspect of the present invention there is provided an apparatus for performing an address lookup to find a longest matching prefix for an N-bit input address in a packet data communication system, comprising: a memory for storing a table containing a predefined portion of an N-bit address with an associated prefix search list containing prefix values that are candidates for the longest matching prefix; an algorithm for selecting a specific prefix value in the prefix search list to structure the N-bit input address to form a search value; and a search algorithm for performing an associative search on the search value to find the longest matching prefix.

In accordance with another aspect of the present invention there is provided a method of performing an address lookup to find a longest matching prefix for an N-bit input address in a packet data communication system, comprising: (a) storing a table containing a predefined portion of an N-bit address with an associated prefix search list containing prefix values that are candidates for the longest matching prefix; (b) selecting a specific prefix value in the prefix search list to structure the N-bit input address to form a search value; and (c) performing an associative search on the search value to find the longest matching prefix.

BRIEF DESCRIPTION OF THE DRAWINGS

The present invention will be described in conjunction with the drawings in which.

DETAILED DESCRIPTION OF EMBODIMENTS OF THE INVENTION

The basis of the address lookup system of the present invention is discussed for Internet packets over a TCP/IP network. However, the discussion applies analogously to other communication networks such as local area network topologies (Ethernet and token ring), a telephone network with central office switches and private branch exchange networks (PBX's).

Internet Protocol Packet

The field definitions of a Ipv4 (32 bit) Internet protocol (IP) packet are summarize in Table A1.

TABLE A1

| FIELD | DESCRIPTION |
|---|---|
| lpv4 (Header Word 1) | version number to facilitate protocol evolution |
| IHL (HW1) | Internet header length-length of header in 32 bit words, minimum header is 5 words comprising 20 octets |
| service type (HW1) | type of service - specifies precedence and type of routing |
| total length (HW1) | total datagram length in octets, includes header |
| identification (HW2) | unique datagram identification for given combination of source, destination addresses, and protocol type that persists while datagram exists within the Internet network |
| Flgs (HW2) | flags-bit(0) is reserved and must be set to zero; bit(1) indicates whether or not the packet may be fragmented, bit(2) is set in all packets except for the last fragment |
| fragment offset (HW2) | indicates position of the current fragment within the complete datagram relative to a 63 bit unit |
| time to live (HW3) | indicates the maximum lifetime of the packet within the network as measured in seconds |
| protocol (HW3) | describes the next level protocol to be used by the receiver on the data field at the destination |
| header checksum (HW3) | 16-bit one's complement of the one's complement sum of all 16-bit words of the header |
| SOURCE ADDRESS (HW4) | 32 bits wide (4–8 bit octets): 3 level hierarchical address consisting of network number, subnetwork number, and host; the subnet field may have any length as specified by a 32 bit mask |
| DESTINATION ADDRESS (HW5) | same as source address |
| options (HW6) | packet options |
| padding (HW6) | used to ensure that the internet header terminates on a 32-bit boundary |
| data (HW7-xx) | payload-multiple number of octets, including header octets, not to exceed 65, 535 |

Figure 1:
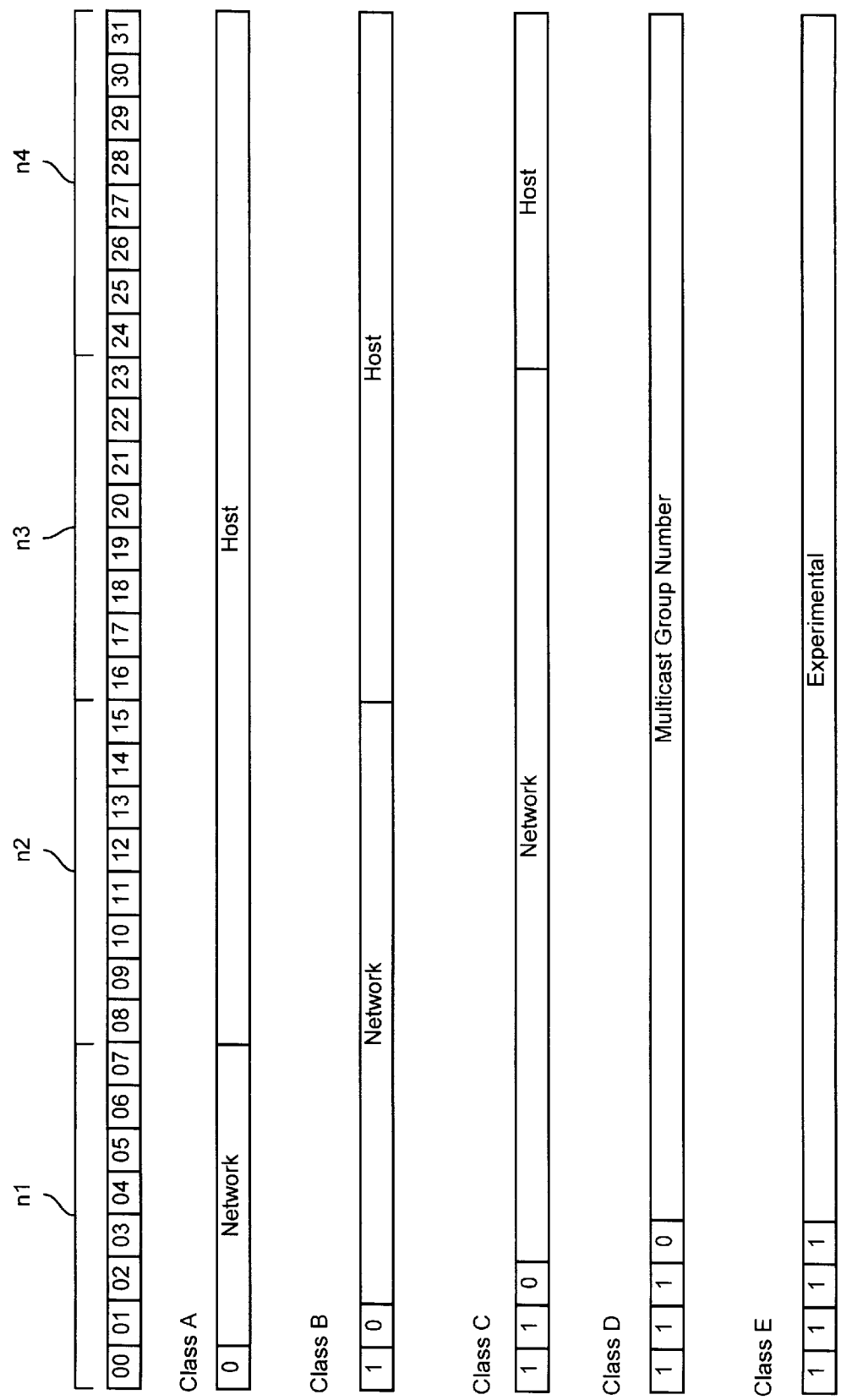
FIG. 1 is a block diagram illustrating the basic Internet address classes.

The term "Internet address" will be used to generically refer to both the source and destination address as defined in Table A1. Five basic Internet class structures (A,B,C,D and E) are illustrated in FIG. 1. The various class structures essentially define the ratio of network to host computers. For example, for a class A address the network portion is defined by $2^7$ bits (128 networks), and the host portion is defined by $2^{24}$ bits (>16 million hosts).

Classes A–C are associated with a corresponding network mask as defined in Table A2.

TABLE A2

| | NETWORK MASK | |
|---|---|---|
| CLASS | Network (n)/Host(h) Octets | Network Mask |
| A | n.h.h.h | 255.0.0.0 |
| B | n.n.h.h | 255.255.0.0 |
| C | n.n.n.h | 255.255.255.0 |

Figure 2:
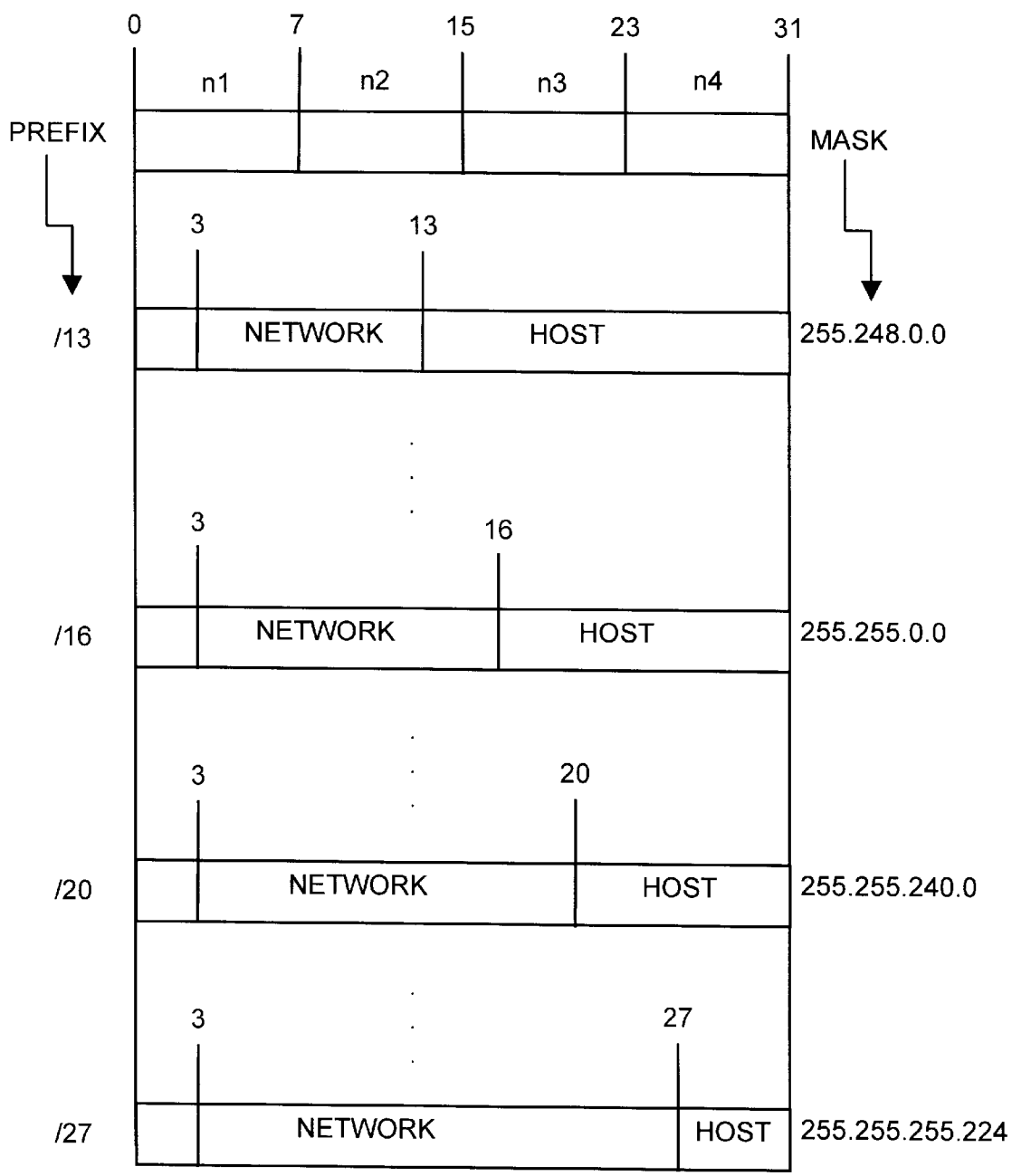
FIG. 2 is a block diagram of class C Internet address network masks for classless routing.

Class C networks use the network mask 255.255.255.0, which results in a large number of networks each consisting of 255 hosts. To provide greater flexibility in provisioning networks and hosts, the Class C network has been defined (by Internet standards organizations) as a classless network that provides a variable length network mask within it's class. By specifying a prefix, the network mask is given a range from "255.248.0.0" to "255.255.255.224", which represents 13 contiguous binary ones to 27 contiguous binary ones. The range is defined as having a prefix value of /13 to /27 (details provided in Table B1). A field representation of various prefix values (/13, /16, /20, /27) and the corresponding network mask for "classless" class C addressing is shown in FIG. 2. The resulting network mask is a 32-bit binary number with a binary one at each bit in the network portion of the address and a binary zero at each host address bit of the address.

TABLE B1

| PREFIX | NETWORKS | HOSTS | NETWORK MASK |
|---|---|---|---|
| /13 | $2^{10}$ = 1,024 | $2^{19}$ = 524,288 | 255.248.0.0 |
| /14 | $2^{11}$ = 2,048 | $2^{18}$ = 262,144 | 255.252.0.0 |
| /15 | $2^{12}$ = 4,096 | $2^{17}$ = 131,072 | 255.254.0.0 |
| /16 | $2^{13}$ = 8,192 | $2^{16}$ = 65,536 | 255.255.0.0 |
| /17 | $2^{14}$ = 16,384 | $2^{15}$ = 32,768 | 255.255.128.0 |
| /18 | $2^{15}$ = 32,768 | $2^{14}$ = 16,384 | 255:255.192.0 |
| /19 | $2^{16}$ = 65,536 | $2^{13}$ = 8,192 | 255.255.224.0 |
| /20 | $2^{17}$ = 131,072 | $2^{12}$ = 4,096 | 255.255.240.0 |
| /21 | $2^{18}$ = 262,144 | $2^{11}$ = 2,048 | 255.255.248.0 |
| /22 | $2^{19}$ = 524,288 | $2^{10}$ = 1,024 | 255.255.252.0 |
| /23 | $2^{20}$ = 1,048,576 | $2^{9}$ = 512 | 255.255.254.0 |
| /24 | $2^{21}$ = 2,097,152 | $2^{8}$ = 256 | 255.255.255.0 |
| /25 | $2^{22}$ = 4,194,304 | $2^{7}$ = 128 | 255.255.255.128 |
| /26 | $2^{23}$ = 8,388,608 | $2^{6}$ = 64 | 255.255.255.192 |
| /27 | $2^{24}$ = 16,772,216 | $2^{5}$ = 32 | 255.255.255.224 |

A computer connected to a TCP/IP network has a unique address defined by four numbers separated by a full stop, for example "194.64.121.53". As discussed above, this address is referred to as an IP address where each numeric field is an 8-bit octet with a value between 0 and 255. The 4-octets of addressing collectively represent a 32-bit binary number that consists of two parts: the network number and the host number. The network number provides two variable length fields that define the network class and the network address. The network class or an associated prefix value determines the length of the network address portion of the 32-bit binary number with the remaining lower order bits being identified with the host address. IP routers use the network address to determine the physical network that needs to be reached in order to connect to the computer having the given host number.

Figure 3:
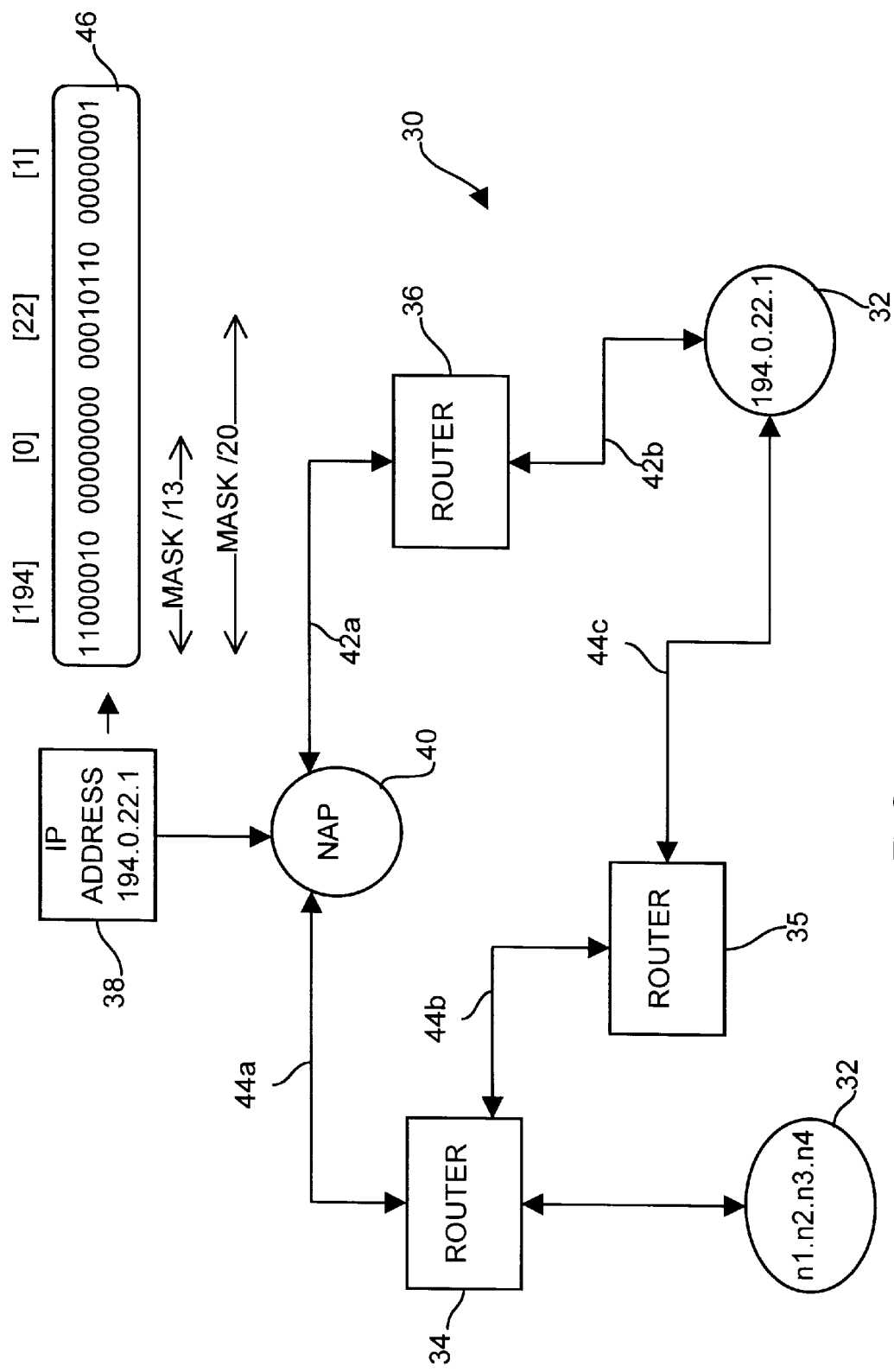
FIG. 3 is a block diagram representing an example of classless interdomain routing.

FIG. 3 illustrates a schematic representation of an IP network 30 to illustrate an example of a classless inter-domain routing process. A plurality of hosts 32 (each having a predefined address n1.n2.n3.n4) provide information to at least one of three IP routers 34,35 and 36 in order to build a routing table. In this example, the router 34 represents general European access (having 131,072 Class C networks) and the router 36 represents an alternative European ISP access (having 16 Class C networks). Router 35 is an intermediate router. An IP packet 38, having destination address 194.0.22.1, is passed to a network access point (NAP) 40 to be routed to the appropriate destination (i.e. to the specific host 32 having address 194.0.22.1).

Specifically, the routers 34,35 and 36 perform a routing lookup within a routing table to determine where to forward the IP packet 38. Forwarding allows the packet 38 to travel to the final destination through a series of hops that characterize an interconnection of the hosts 32 that are linked through the routers 34,35 and 36. The actual path followed by the packet 38 may differ from the path followed by a seceding packet as the IP network 30 provides a plurality of paths 42a–b and 44a–c that are suitable in reaching the destination. The plurality of paths 42 and 44 result in a robust network capable of rerouting the packet 38 in order to avoid congestion or network faults.

Since there are a plurality of paths to be selected during a routing lookup, the selected routing entry must correspond to the longest matching prefix (LMP), which represents the network entry in the routing table that has the longest number of contiguous address bits. For each network address in the routing table there is an associated network mask that is defined by either a class type, or a prefix value as specified for classless routing. The network address ranges are classified according to the network class designations (A,B,C,D,E) as defined above. For router 34 the address range is 194.0.0.1 to 195.255.255.254 having a mask of 255.248.0.0 and a prefix of /13. For router 36 the address range is 194.0.16.1 to 194.0.31.254 having a mask of 255.255.240.0 and a prefix of /20.

The packet 38 is transmitted along a path that generates the longest match (i.e. the path with the greatest number of ones in the address 46 masked by the prefix mask). First consider path 44a–c, with a prefix of /13 the number of ones in the mask is equal to 13, which matches three ones in the address 46 (refer to address 46 with prefix /13). Then consider path 42a–b, with a prefix of /20 the number of ones in the mask is equal to 20, which matches four ones in the address 46 (refer to address 46 with prefix /20). Therefore, the selected path for the IP packet 38 is through router 36 (path 42a–b) as opposed to through routers 34 and 35 (path 44a–c).

Figure 4:
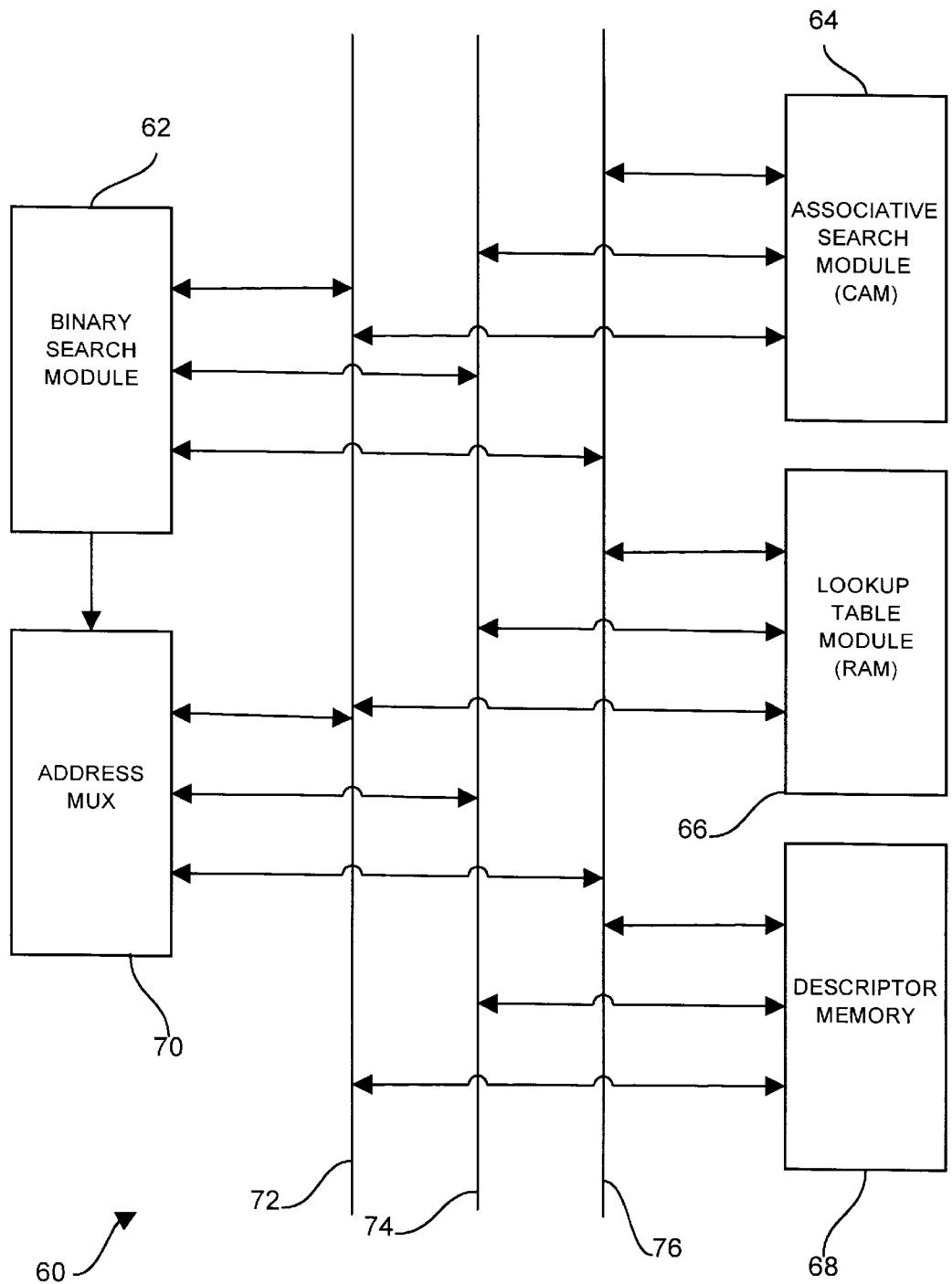
FIG. 4 is a block diagram illustrating the address lookup system according to the present invention.

The present invention provides an address lookup system and method for transmitting a single packet to a destination port. FIG. 4 illustrates the main components of an address lookup system 60 for IP packet forwarding according to the present invention. In general, the address lookup system 60 includes a series of modules: a binary search module 62; an associative search module 64 (implemented in a content addressable memory CAM); a lookup table module 66 (implemented in random access memory RAM); a descriptor memory 68; and an address multiplexer 70 communicating over an address bus 72, a data bus 74, and a control bus 76.

The content addressable memory (CAM) component of the module 64 (for example the MegaCAM™ by Nortel™) is a memory device where all information in the memory is compared against an input in a single clock cycle. When writing data into a CAM, the processor selects a memory address location and provides the associated data. In the search mode, the CAM will retrieve that address when the associated data is input to the search port.

The address lookup system 60 partitions the 32-bit destination address into two sections, one section is subject to a search algorithm in the lookup table module 66 and a masked portion of the destination address is subject to a search algorithm in the associative search module 64 directed by the binary search module 62. The partitioned destination address creates the ability to realize a scalable forwarding table for fast routing lookups. Using only two memory devices (a RAM in module 66 and a CAM in module 64), a forwarding table can be implemented at a network interface or at a service port that provides centralized forwarding lookups. Using a minimal number of components allows typically stringent power, cost, and board area constraints to be achieved.

The two memory modules 64 and 66 provide very specific functions. The RAM of module 66 is used as a lookup table to provide a 16-bit binary decoding tree, and the CAM of module 64 is used to provide an associative search of network addresses that are stored in logical bins that have a specific prefix value. The binary search module 62 is guided by lookup table data in the RAM module 66 to probe the CAM module 64 to find the longest matching prefix. The binary search module 66 is instructed to follow either a symmetrical or an asymmetrical search pattern on predetermined prefix search lists produced by the lookup table module 66.

The binary search module 62 receives pointer data from both the associative search module 64 and the lookup table module 66, and selects either one of two pointers to address the address mux 70 to retrieve a destination port address.

Figure 6:
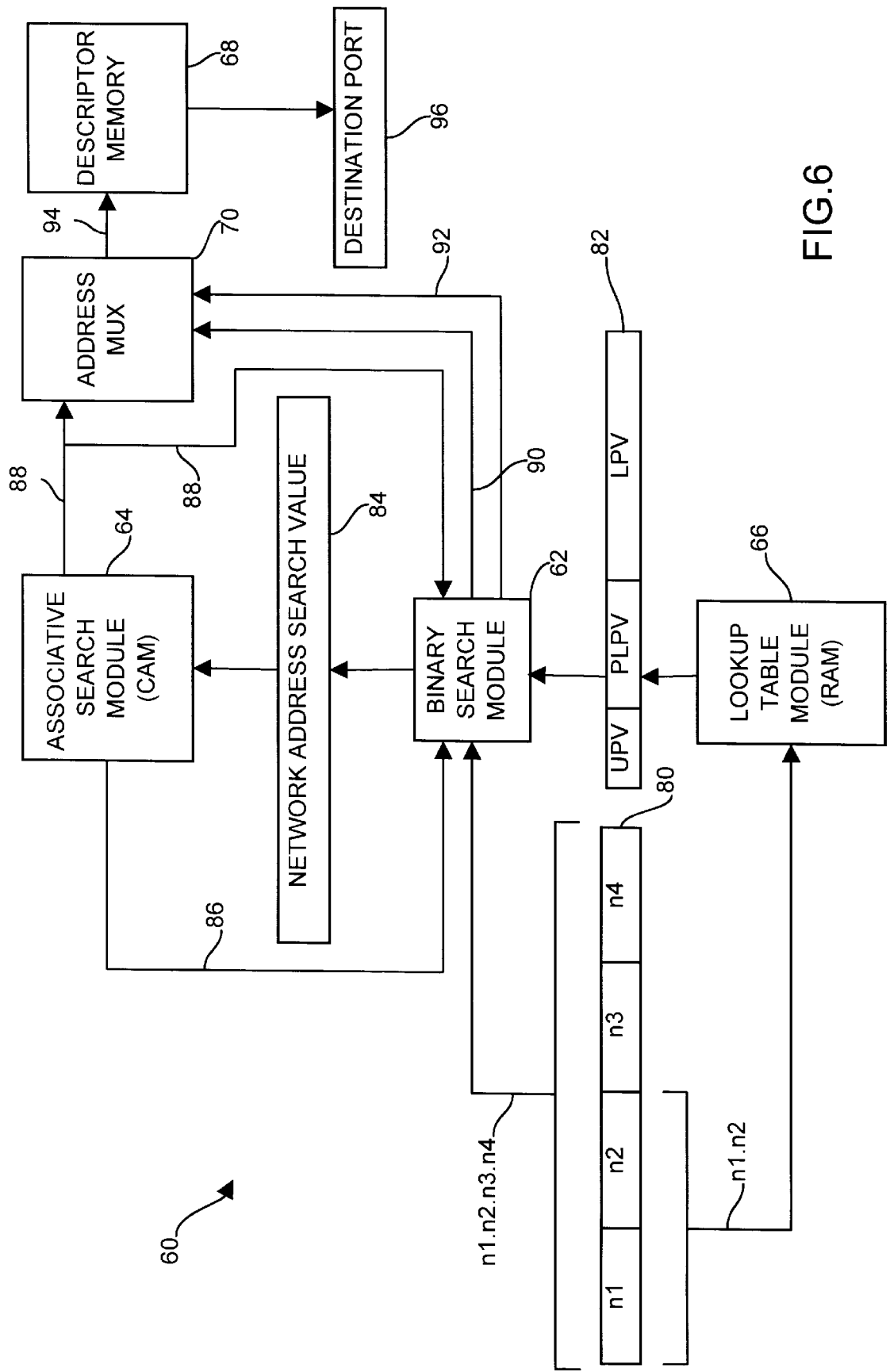
FIG. 6 is a functional block diagram illustrating the address lookup method of the present invention.

Further detail of this process will be discussed below in conjunction with FIG. 6.

Figure 5:
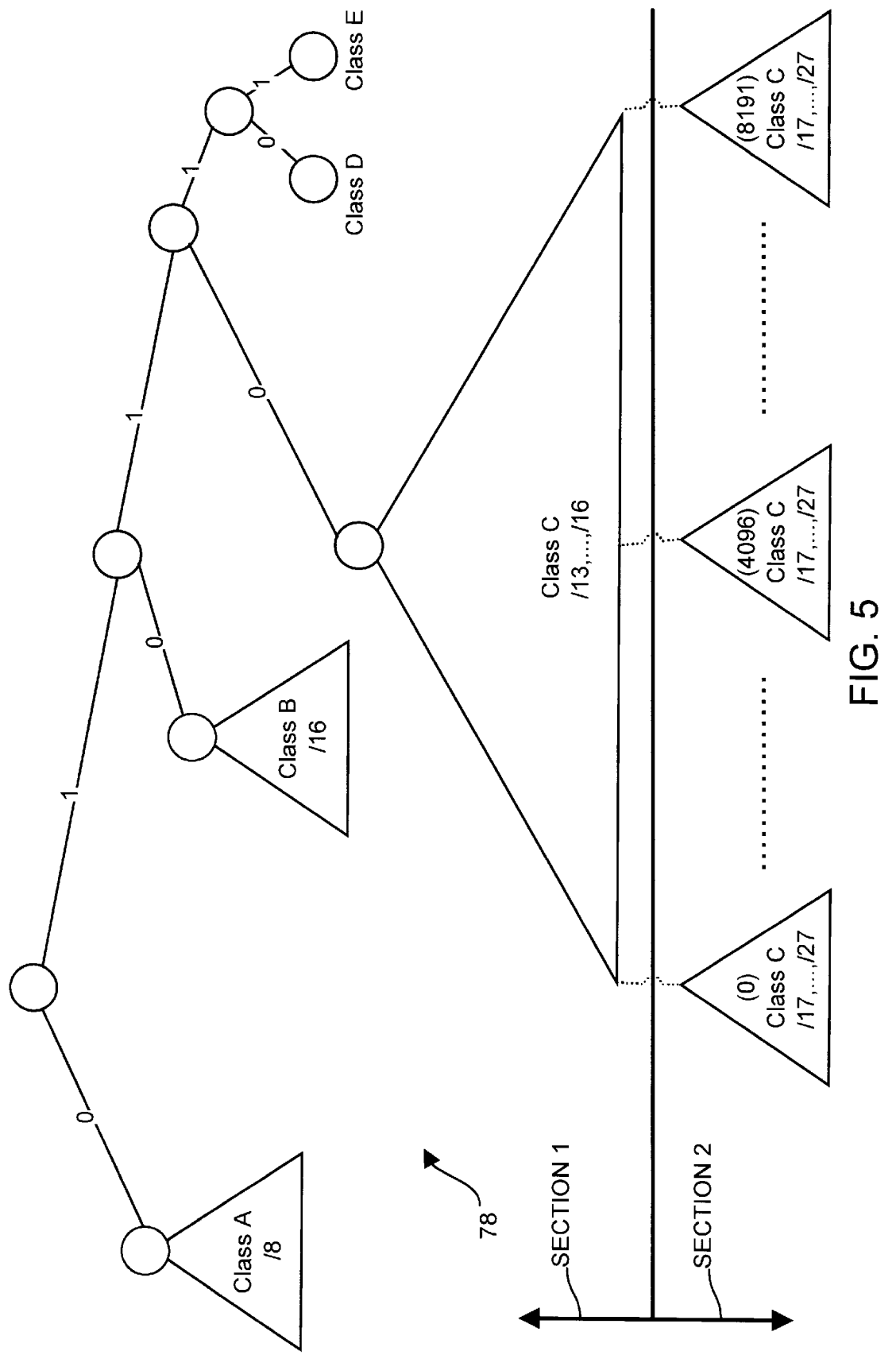
FIG. 5 is a prefix range tree illustrating the address search partitioning according to the address lookup method of the present invention.

FIG. 5 provides a representation of a prefix range tree 78 to illustrate the address partitioning scheme of the present invention. Within the decoded range of addresses both Class A and Class B network addresses are directly supported using a single memory lookup. Class C network addresses in the prefix range of /13 to /16 use 8192 decoded addresses out of the possible 65,536 lookup table entries in a 16-bit tree. Section 1 represents the lookup table module 66 portion of the search in the form of a 16-bit decoding tree to determine the longest matching prefix for classes A and B network addresses as well as prefix numbers /13 to /16 for class C network addresses; and section 2 represents the associative search module 64 portion of the search in the form of an associative search of network addresses for specific prefixes in the range of /17 to /27 based on a prefix order list produced during the lookup search in section 1.

To avoid searching prefix values in section 2 that have no network entries in the CAM of module 64, information obtained from the lookup table module 66 is used to identify the prefix values that need to be searched. For example, the lookup table module 66 may direct the binary search module 62 to perform a search for matches in the CAM of module 64 for prefix values [/18, /20, /21, /24, /27]; as opposed to performing a binary search on all prefix values /17 to /27. In this example, assume that the network addresses associated with the lookup table module 66 decode are uniformly distributed across the five active prefix values, the search will be completed within two or three probes of the CAM of module 64.

In practice, using the Nortel MegaCAM™ as the CAM of module 64, which has a search latency of 40 ns, the longest matching prefix is found within 100 ns average latency. The latency associated with reading the lookup table in RAM of the module 66 is normally hidden through the use of pipeline access that allows for concurrent operation of the RAM of module 66 and the CAM of module 64. Class A, B and C network addresses (with prefix values of /13 to /16) have a lookup latency defined by the RAM of module 66 that would typically be a single memory access of 15 to 20 ns, provided that no lower prefix values are present in the search list.

The section 2 search (in the CAM of module 64) can be further optimized by examining the distribution of network addresses that are associated with each prefix value within the list defined by a specific decode in the lookup memory module 66. For example, a distribution rule can be used that states that an active prefix having a total number of network addresses that exceeds the sum of the network addresses distributed over the remaining prefixes to be declared a priority prefix. The distribution rule of this example is 50%, however other distribution percentages can be established. The binary search module 62 directs the CAM of module 64 to search the priority prefix first due to the higher probability of being able to find a match. If there are no higher prefix values in the list then the search is terminated with a single access to the CAM of module 64. This exception results in an asymmetrical binary search of the prefix list produced by the lookup table module 66. If a further search is required after the priority prefix, the priority prefix is removed from the search list and the search algorithm reverts to a symmetrical binary search.

A detailed description of the address lookup system and method of the present invention will be discussed in conjunction with the functional block diagram of FIG. 6.

Incoming Destination Address

An incoming destination address (IDA) 80 is a packet address (n1.n2.n3.n4) consisting of four address bytes were n1 is the most significant address byte.

First Level Read—Lookup Table

Address bytes n1.n2 address the lookup table module 66 (containing a lookup table [LUT]) for translation instructions used to process the IDA 80. In particular, a network address for the upper prefix is selected from n1.n2 by masking the two byte address with a prefix mask. Note that there is no search at this stage. When the LUT is read there is a prefix value that gives the initial longest matching prefix (LMP) within n1.n2.

Data in the LUT gives the prefix numbers that contain network addresses that are possible candidates for processing by the associative search module 64 for forwarding the packet. The plurality of possible matches describes the destination ports through which the packet may reach its ultimate destination. The binary search module 62 will select from the plurality of possible matches the route that has the longest matching network address.

In particular, a LUT discovery describes a route having a prefix range [/13, . . . ,/16]. Since the LUT is a fully decoded 16-bit table each n1.n2 lookup has a preloaded memory location that is used to describe the search sequence to be followed. This memory location can be empty or can contain a prefix search list 82 to facilitate the search operation. The prefix search list 82 consists of: (1) an upper prefix value (UPV) [/13, . . . ,/16] or a default upper descriptor point value, (2) a priority lower prefix value (PLPV) [one of /17, . . . ,/27], and (3) a list of lower prefix values (LPV) [/17, . . . ,/27].

If the prefix search list 82 includes an UPV [/13, . . . ,/16] then an initial matching network address is available for the given prefix value. The presence of prefix values greater than /16 in the list of lower prefix values implies that one or more network address candidates residing in the CAM of module 64 may result in a longer matching prefix than the upper prefix value.

If an upper prefix value is not in the prefix search list 82 then a default descriptor point value is assumed until it is replaced by a lower prefix match in the CAM of module 64. If no lower prefix values are present in the prefix search list 82 then the default value is returned provided there is no upper prefix match. The default value is loaded into the forwarding table by higher level routing software found in the network controller (not shown).

The priority lower prefix value is designated to allow for prefix distributions whereby one prefix has significantly more network address candidates than the sum of the remaining prefixes.

The terms upper and lower describe the relative position in a decoding tree used to visualize the translation of the IDA 80. The term "upper" refers to an address in the top of the decoding tree while the term "lower" refers to a longer address that would be found lower down in the tree. The lookup table module 66 describes the upper addresses consisting of n1.n2, and the associative search module 64 describes the lower address range n1.n2.n3.n4.

Binary Search Module Processing

If no priority lower prefix value is designated in the ordered prefix list 82 then the list of lower prefix values is searched according to a symmetrical binary search approach that computes the mid-point of the prefix values in the list 82 and then uses the mid-point prefix value to search the CAM of module 64. If a match is found the upper half of the prefixes in the list 82 are discarded. If a match is not found the lower half of the prefixes in the list 82 are discarded.

The binary search results in a recursive depletion of the prefix search list 82 resulting in either the longest matching prefix being found or no entry in the CAM of module 64 being detected.

If a priority lower prefix value is designated in the prefix search list 82 the symmetrical binary search is altered to an asymmetrical binary search. In particular, if the first prefix value in the lower prefix list is greater than the prefix value of the next prefix in the lower prefix list than the first prefix is declared a priority prefix value that is searched first. If no match is found after searching the priority prefix value, then it is deleted from the prefix search list 82 leaving the list of lower prefix values that are symmetrically scanned as discussed above.

A prefix value is selected by the binary search module 62 discussed above from the prefix search list 82. The selected prefix number is used to generate a network address search value (SV) 84 from the full destination address 80 (n1.n2.n3.n4). The network address search value 84 is presented to the associative search module 64 where an associative comparison is made to all entries in the CAM of the module 64 having the same prefix number.

In particular, the destination address 80 is masked with the selected prefix value and appended with the prefix number to obtain the network address search value (SV) 84 for probing the CAM of the module 64. The SV is defined as:

SV=prefix&IDA•prefix mask
 where prefix=selected prefix number, &=append function, IDA=incoming destination address, •=mask function, prefix mask=4 octet representation of prefix number (e.g. for prefix /20, the prefix mask=255.255.240.0)

Second Level Search-Content Addressable Memory

Network addresses are sorted into bins that correspond to the prefix values [/17, . . . ,/27] in the CAM of the module 64.

The associative search of the SV 84 in the CAM of the module 64 results in one of three possible outcomes: (1) a match to a network address-a match flag 86 is passed to the binary search module 62, (2) a match to a marker (i.e. to a pseudo network address), or (3) no match. Markers in the CAM of the module 64 are used to prevent a premature end of a search at an upper level when no match is detected and a valid address exists at a lower level. Markers are dynamically controlled throughout the search process and are discussed in more detail below.

Option 1—Match to a Network Address

If the match was based on a priority lower prefix value (i.e. an asymmetrical binary search), then all prefix values less than the value of the priority prefix are deleted. If there are no higher value prefixes remaining in the prefix search list 82 then the longest matching prefix has been found. If there are higher prefix values remaining in the prefix search list 82 a symmetrical binary search is made on the prefix search list 82 to determine if a longer matching prefix exists at a lower prefix level.

If the match was based on a lower prefix value (i.e. during a symmetrical binary search) then the lower level prefix values in the prefix search list 82 remain to be searched. The binary search module 62 will continue to probe the lower prefix values to determine if a longer matching prefix is available in the lower levels.

Option 2—Match to a Marker

An address match to a marker in the CAM of module 64 informs the binary search module 62 that a network address match may reside at a lower prefix level and needs to be tested by continuing the search on the remaining levels lower than the current prefix level.

Option 3—No Match

If no match is found then the upper prefix value found in the LUT in the lookup table module 66 is selected by the binary search module 62.

A lower pointer 88 represents the location of the network address found in the CAM of module 64, which is a unique hardware address that is specific to the route to be used. For example, a CAM having 64,000 memory registers has 64,000 unique addresses. By loading a network address into a specific memory register in the CAM of module 64, the corresponding address will be returned by the CAM whenever the destination search address matches the value stored in the memory register.

An upper pointer 90 is uniquely defined by the n1.n2 octets of the destination address 80 as used to read the LUT in the RAM of module 66. The selection of which pointer (lower 88 or upper 90) to use is made by the binary search module 62 and passed to the address MUX 70 as pointer selection 92. If a match is found in the CAM of module 64 then the address returned by the CAM of module 64 is used to uniquely address a data table in the descriptor memory 68. If no match is found then the n1.n2 octets are used to read the data table in the memory 68. The n1.n2 address space is mutually exclusive to the address range returned by the CAM of module 64.

A descriptor pointer 94 from the address MUX 70 is either the upper or lower pointer value 88, 90 that is selected by the binary search module 62. The descriptor pointer 94 is used by the descriptor memory 68 that contains the forwarding data used to route the packet having IDA 80 to a given destination port(s) 96.

Markers

For the binary search on the prefix search list to work properly, markers must be included in the CAM of module 64 corresponding to shorter lengths to point to prefixes of greater lengths. Markers are a well known requirement for binary searching and are needed to direct the binary search module 62 to look for matching prefixes of greater length. An example illustrating the need for markers is discussed below in conjunction with FIG. 7.

Marker requirements are determined for each entry in the CAM of module 64 by following the search sequence of the binary search module 62 as described by the prefix search list generated by the lookup table module 66. For each prefix level search that fails to match the current search address a marker is placed in the CAM of module 64.

Figure 7:
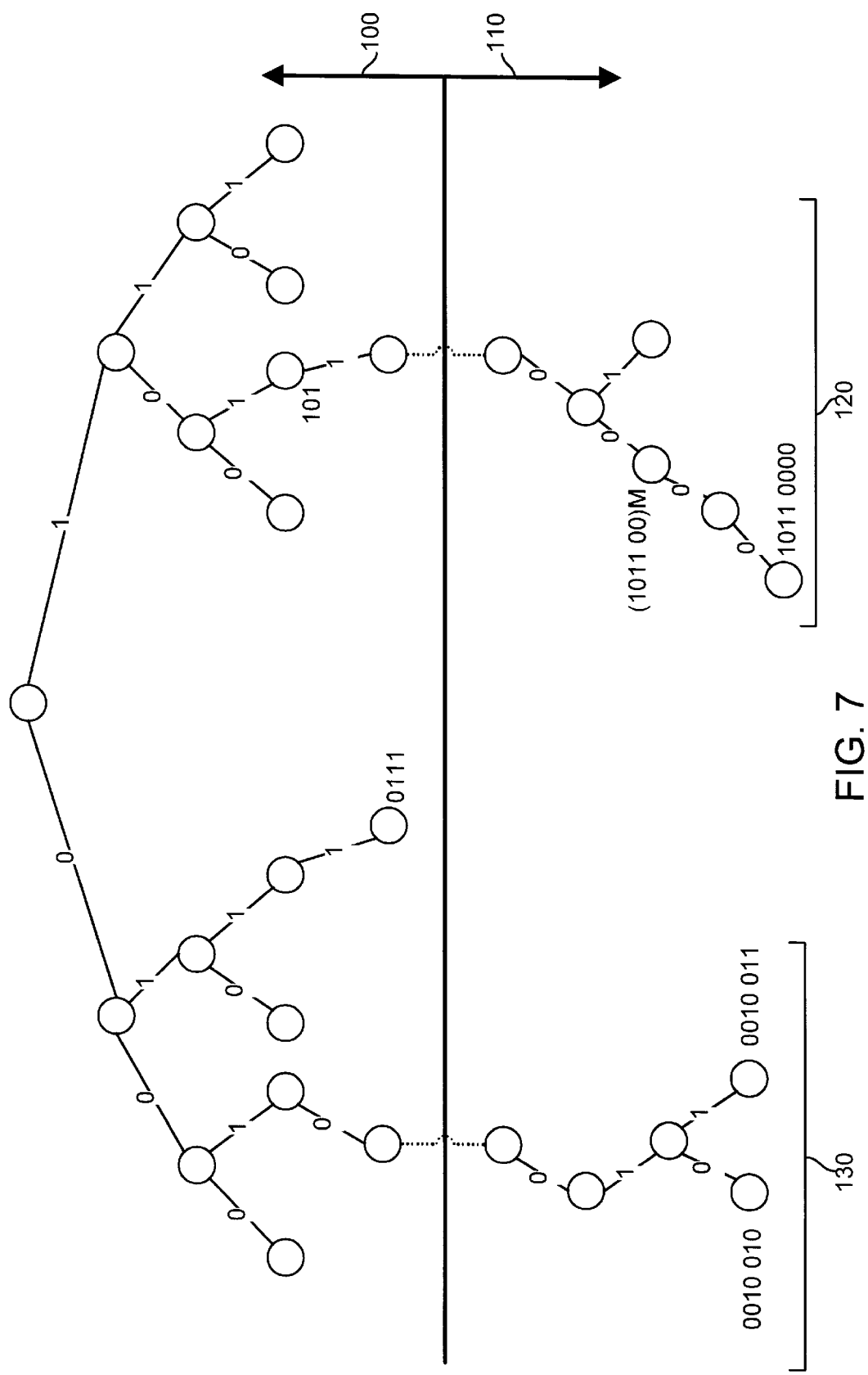
FIG. 7 is a representation of an example of searching using the address lookup method of the present invention.

FIG. 7 provides a representation of the address lookup method of the present invention using a simple 8 bit address. The address lookup method is divided into a 4-bit decoding tree section defined by an upper level 100 and an associative search section defined by a lower level 110. A plurality of network addresses are stored in LUT decoding levels (for section 100) and in bins (for section 110) that correspond to respective network address lengths as provided in Table C1. The network addresses designated as $(x/y)^M$ are markers.

TABLE C1

| LUT DECODING LEVELS (=Prefix Value) | NETWORK ADDRESSES/PREFIX |
| --- | --- |
| 1 | 0/1 |
| 2 | 01/2, 11/2 |
| 3 | 100/3, 101/3 |
| 4 | 0111/4 |

| CAM BIN Nos. (=Prefix Value) | NETWORK ADDRESSES/PREFIX |
| --- | --- |
| 5 | 00100/5, 10110/5 |
| 6 | 101101/6, $(101100/6)^M$ |
| 7 | 0010010/7, 0010011/7 |
| 8 | 10110000/8 |

Example 1

An incoming destination address is designated as [1011 0000]. The first four bits [1011] of the address is decoded through the 4-bit binary tree 100. The initial longest matching prefix is [101] at upper prefix value /3. Based on this information an ordered lower level prefix list is generated [/5,/6,/8] (i.e. [101] appears as the first 3 bits for network addresses in bins 5, 6, and 8 in Table C1). Since no priority prefix is designated, a symmetrical search is performed starting with prefix value /6. The IDA[1011 0000] is masked with prefix /6 to produce a search value =[1011 00]. The CAM module is probed in bin 6 with the search value [1011 00] and a marker match [(1011 00) M] is found. The marker is used to inform the binary search module to search a lower prefix level.

More particularly, without the marker the search would fail and have no indication that it should search among the longer prefix values for a better matching prefix.

The IDA [1011 0000] is masked with prefix /8 (based on marker match with prefix value /6) to produce a search value =[1011 0000]. The CAM is probed in bin 8 with the search value [1011 0000] and a network address match is found. Therefore, the longest matching prefix is [1011 0000] and the search is complete since no lower level prefixes remain to be searched. The search pattern of example 1 is designated as section 120 in FIG. 7.

Example 2

An incoming destination address is designated as [1011 1111]. The first four bits [1011] of the address is decoded through the 4-bit binary tree 100. The initial longest matching prefix is [101] at upper prefix value /3. Based on this information an ordered lower level prefix list is generated [/5,/6,/8] (i.e. [101] appears as the first 3 bits for network addresses in bins 5, 6, and 8 in Table C1). Since no priority prefix is designated, a symmetrical search is performed starting with prefix value /6. The IDA[1011 1111] is masked with prefix /6 to produce a search value=[1011 11]. The CAM is probed in bin 6 with the search value [1011 11] and no match is found. Prefix level /5 is searched next based on the symmetrical search approach. The IDA [1011 1111] is masked with prefix /5 to produce a search value=[1011 1]. The CAM is probed in bin 5 with the search value [1011 1] and no match is found. CAM probing is terminated based on symmetrical search approach. No lower level prefix provides a match for the IDA. Therefore, the longest matching prefix is at the upper level value /3 [101]. The search pattern of example 2 is also designated as section 120 in FIG. 7.

Example 3

An incoming destination address is designated as [0010 0111]. The first four bits [0010] of the address is decoded through the 4-bit binary tree 100. The initial longest matching prefix is [0] at upper prefix value /1. Based on this information an ordered lower level prefix list is generated [/5,/7] (i.e. [0] appears as the first bit for network addresses in bins 5 and 7 in Table C1). Since no priority prefix is designated, a symmetrical search is performed starting with prefix value /7. The IDA[0010 0111] is masked with prefix /7 to produce a search value=[0010 011]. The CAM section 110 is probed in bin 7 with the search value [0010 011] and a network address is found. Therefore, the longest matching prefix is [0010 011] and the search is complete since no lower level prefixes remain to be searched. The search pattern of example 3 is designated as section 130 in FIG. 7.

EXAMPLES

The following examples use real 32-bit addressing data to illustrate the address lookup method of the present invention.

A process file is obtained from a router site on the Internet at http://www.merit.edu/impa/. The process file represents a portion of over 35,000 network addresses stored at the router site.

Process File

| Network Address | Mask Prefix |
| --- | --- |
| 193 | 255.255.254.0 |
| 193.0.14 | 255.255.255.0 |
| 193.1 | 255.255.0.0 |
| 193.2 | 255.255.0.0 |
| 193.3.9 | 255.255.255.0 |
| 193.3.32 | 255.255.252.0 |
| 193.3.39 | 255.255.255.0 |
| 193.3.49 | 255.255.255.0 |
| 193.3.60 | 255.255.254.0 |
| 193.3.128 | 255.255.224.0 |
| 193.3.128 | 255.255.254.0 |
| 193.3.133 | 255.255.255.0 |
| 193.3.141 | 255.255.255.0 |
| 193.3.144 | 255.255.248.0 |
| 193.3.192 | 255.255.224.0 |
| . . . | |
| 193.32.12 | 255.255.252.0 |
| 193.32.12 | 255.255.255.0 |
| . . . | |

The process file extracts the network addresses and corresponding network mask which is converted to a prefix value corresponding to the number of contiguous "1"s.

Routing File

| Network Address | Prefix |
| --- | --- |
| 193.0.0.0 | 23 |
| 193.0.14.0 | 24 |
| 193.1.0.0 | 16 |
| 193.2.0.0 | 16 |
| 193.3.9.0 | 24 |
| 193.3.32.0 | 22 |
| 193.3.39.0 | 24 |
| 193.3.49.0 | 24 |
| 193.3.60.0 | 23 |
| 193.3.128.0 | 19 |
| 193.3.128.0 | 23 |
| 193.3.133.0 | 24 |
| 193.3.141.0 | 24 |
| 193.3.144.0 | 21 |
| 193.3.192.0 | 19 |
| . . . | |
| 193.32.12.0 | 22 |
| 193.32.12.0 | 24 |
| . . . | |

The network addresses of the routing file are organized in bins representing prefix values to form the table in the CAM of module 64.

CAM Table

| Bin/Prefix | Network Addresses |
| --- | --- |
| 17 | n1.n2.n3.n4; n1.n2.n3.n4; . . . |
| 18 | n1.n2.n3.n4; n1.n2.n3.n4; . . . |
| 19 | n1.n2.n3.n4; n1.n2.n3.n4; . . . |
| 20 | 193.26.96.0; . . . |
| 21 | (193.26.96.0)$^M$; . . . |

-continued

CAM Table

| Bin/Prefix | Network Addresses |
|---|---|
| 22 | 193.5.4.0; 193.32.12; . . . |
| 23 | n1.n2.n3.n4; n1.n2.n3.n4; . . . |
| 24 | 193.3.9.0; 193.32.12.0; . . . |
| 25 | n1.n2.n3.n4; n1.n2.n3.n4; . . . |
| 26 | n1.n2.n3.n4; n1.n2.n3.n4; . . . |
| 27 | n1.n2.n3.n4; n1.n2.n3.n4; . . . |

The routing file is processed to provide a prefix distribution table of the most significant 16-bit (first two octets (n1.n2)) network addresses with the prefix values associated with each address. Each prefix includes the total number of associated network addresses.

Prefix Distribution Table

| n1.n2 of Network Address | Prefix Distributions |
|---|---|
| 193.0 | 1/23; 1/24 |
| 193.1 | 1/16 |
| 193.2 | 1/16 |
| 193.3 | 2/19; 1/21; 1/22; 2/23; 7/24 |
| 193.4 | 1/16 |
| 193.5 | 1/16; 3/22; 2/23; 12/24 |
| 193.6 | 1/16; 1/24 |
| 193.7 | 2/19 |
| 193.8 | 1/16; 7/24 |
| 193.9 | 2/20; 1/22; 5/24 |
| 193.10 | 1/16; 1/21; 1/22; 2/24 |
| 193.12 | 1/14; 2/22; 3/24 |
| 193.13 | 1/19; 4/24 |
| 193.16 | 1/19; 2/20; 2/21; 1/22; 2/24 |
| 193.17 | 1/19; 1/22; 4/23; 8/24 |
| . . . | |
| 193.26 | 1/19; 1/20; 1/21; 1/24 |
| . . . | |
| 193.32 | 1/20; 2/21; 2/22; 1/23; 1/24 |
| . . . | |

A lookup table is constructed from the prefix distribution file by reorganizing the order of the prefix values. The first prefix listed is the initial longest matching prefix selected from /13, /14, /15, /16. The next prefix is either the prefix with the largest number of associated addresses or the first prefix in the original prefix list that is greater than /16. If the initial longest matching prefix is empty then the next prefix value automatically becomes the first. The change in ordering for given ranges of prefix values automatically differentiates the significance of the prefix value.

Lookup Table

| Address Location | n1.n2 of Network Address | Ordered Prefix List |
|---|---|---|
| 1 | 193.0 | 23 24 |
| 2 | 193.1 | 16 |
| 3 | 193.2 | 16 |
| 4 | 193.3 | 24 19 21 22 23 |
| 5 | 193.4 | 16 |
| 6 | 193.5 | 16 24 22 23 |
| 7 | 193.6 | 16 24 |
| 8 | 193.7 | 19 |

-continued

Lookup Table

| Address Location | n1.n2 of Network Address | Ordered Prefix List |
|---|---|---|
| 9 | 193.8 | 16 24 |
| 10 | 193.9 | 24 20 22 |
| 11 | 193.10 | 16 21 22 24 |
| 12 | 193.12 | 14 24 22 |
| 13 | 193.13 | 24 19 |
| 14 | 193.16 | 19 20 21 22 24 |
| 15 | 193.17 | 24 19 22 23 |
| . . . | . . . | . . . |
| 21 | 193.26 | 19 20 21 24 |
| . . . | . . . | . . . |
| 27 | 193.32 | 20 21 22 23 24 |
| . . . | | |

Example 1

Incoming Destination Address
193.3.9.0 (n1.n2.n3.n4)
First Level Read
  (a) read n1.n2 (193.3) in the lookup table to determine the prefix search list
  (b) at address location 4 of the LUT the prefix search list is: [24 19 21 22 23]
  (c) prefix /24 is designated as a priority prefix since it has 7 associated addresses which is greater than the sum total of the associated address for prefixes 19(2), 21 (1), 22(1), and 23(2): total (6) (refer to Prefix Distribution Table)
Second Level Search
  (a) prefix search list is passed to the binary search module
  (b) since a priority prefix /24 is designated an asymmetrical search is performed
CAM PROBE 1
  (a) mask the IDA with prefix /24 and append with prefix /24 to obtain a search value (SV) for the CAM
    SV=prefix&IDA•prefix mask
    IDA=193.3.9.0, prefix=/24, prefix mask= 255.255.255.0
    SV=193.3.9.0/24
    Masking process
    n1,n2,n3-passed (no change)
    n4-not passed (zero)
  (b) probe the CAM for the SV i.e. search for 193.3.9.0 in bin 24 of CAM Table
  (c) match found—search ends since /24 is the highest prefix in the prefix search list
  (d) longest matching prefix: 193.3.9.0

Example 2

Incoming Destination Address
193.32.12.0 (n1.n2.n3.n4)
First Level Read
  (a) read n1.n2 (193.32) in the lookup table to determine the prefix search order
  (b) at address location 27 of the LUT the prefix search list is: [20 21 22 23 24]
  (c) no prefix is designated as a priority prefix
Second Level Search
  (a) prefix search list is passed to the binary search module
  (b) since no priority prefix is designated a symmetrical search is performed (i.e. begin with mid-point prefix /22)

CAM PROBE 1
(a) mask the IDA with prefix /22 and append with prefix /22 to obtain a search value (SV) for the CAM
SV=prefix&IDA•prefix mask
IDA=193.32.12.0, prefix=/22, prefix mask= 255.255.252.0
SV=193.32.12.0/22
  Masking process
  n1,n2-passed (no change)
  n4-not passed (zero)
  n3 masked with 252
    12=[00001100]
    252=[11111100]
    n3 masked=[00001100]=12
(b) probe the CAM for the SV i.e. search for 193.32.12.0 in bin 22 of CAM Table
(c) match found at prefix /22, further searching required since lower level prefix remain in the prefix order list (i.e. 23 ,24)
CAM PROBE 2
(a) the next search using the symmetrical search approach is prefix /24
(b) mask the IDS with prefix /24 and append with prefix /24 to obtain a search value (SV) for the CAM
SV=prefix&IDA•prefix mask
IDA=193.32.12.0, prefix=/24, prefix mask= 255.255.255.0
SV=193.32.12.0/24
  Masking process
  n1,n2,n3-passed (no change)
  n4-not passed (zero)
(c) probe the CAM for the SV i.e. search for 193.32.12.0 in bin 24 of CAM Table
(d) match found at prefix /24—search ends since /24 is the lowest prefix value in the prefix search list
(e) longest matching prefix: 193.32.12.0

Example 3

Incoming Destination Address
  193.26.96.0 (n1.n2.n3.n4)
First Level Read
  (a) read n1.n2 (193.26) in the lookup table to determine the prefix search list
  (b) at address location 21 of the LUT the prefix search list is: [19 20 21 24]
  (c) no prefix is designated as a priority prefix
Second Level Search
  (a) prefix search list is passed to the binary search module
  (b) since no priority prefix is designated a symmetrical search is performed (i.e. begin with mid-point prefix /21)
CAM PROBE 1
(a) mask the IDA with prefix /21 and append with prefix /21 to obtain a search value (SV) for the CAM
SV=prefix&IDA•prefix mask
IDA=193.26.96.0, prefix=/21, prefix mask= 255.255.248.0
SV=193.26.96.0/21
  Masking process
  n1,n2-passed (no change)
  n4-not passed (zero)
  n3 masked with 248
    96=[01100000]
    248=[11111000]
    n3 masked=[01100000]=96
(b) probe the CAM for the SV i.e. search for 193.26.96.0 in bin 21 of CAM Table
(c) marker match found—the marker was left by a longer network address indicating that the search should continue down to a lower level prefix (i.e. prefix /24 in the prefix order list)
CAM PROBE 2
(a) the next search based on the detected marker of cam probe 1 is prefix /24
(b) mask the IDS with prefix /24 and append with prefix /24 to obtain a search value (SV) for the CAM
SV=prefix&IDA•prefix mask
IDA=193.32.12.0, prefix=/24, prefix mask= 255.255.255.0
SV=193.32.12.0/24
  Masking process
  n1,n2,n3-passed (no change)
  n4-not passed (zero)
(c) probe the CAM for the SV i.e. search for 193.32.12.0 in bin 24 of CAM Table
(d) no match found at prefix /24—search continues
CAM PROBE 3
(a) the next search based on the symmetrical approach is prefix /20
(b) mask the IDS with prefix /20 and append with prefix /20 to obtain a search value (SV) for the CAM
SV=prefix&IDA•prefix mask
IDA=193.26.96.0, prefix=/20, prefix mask= 255.255.240.0
SV=193.26.96.0/20
  Masking process
  n1,n2-passed (no change)
  n4-not passed (zero)
  n3 masked with 240
    96=[01100000]
    240=[11110000]
    n3 masked=[01100000]=96
(c) probe the CAM for the SV i.e. search for 193.26.96.0 in bin 20 of CAM Table
(d) match found at prefix /20—search ends since /20 is the lowest prefix level in the prefix list that returned a match from the CAM
(e) longest matching prefix: 193.26.96.0

Example 4

Incoming Destination Address
  193.5.4.0 (n1.n2.n3.n4)
First Level Read
  (a) read n1.n2 (193.5) in the lookup table to determine the prefix search list
  (b) at address location 6 of the LUT the ordered prefix list is: [16 24 22 23]
  (c) initialize upper longest matching prefix to prefix /16 and delete prefix /16 from prefix list to form new prefix list: 24 22 23
  (d) prefix /24 is designated as a priority prefix since it has 12 associated addresses which is greater than the sum total of the associated address for prefixes 22(3) and 23(2): total (5) (refer to Prefix Distribution Table)
Second Level Search
  (a) prefix search list is passed to the binary search module
  (b) since a priority prefix /24 is designated an asymmetrical search is performed
CAM PROBE 1

(a) mask the IDA with prefix /24 and append with prefix /24 to obtain a search value (SV) for the CAM
SV=prefix&IDA•prefix mask
IDA=193.5.4.0, prefix=/24, prefix mask=255.255.255.0
SV=193.5.4.0/24
Masking process
n1,n2,n3-passed (no change)
n4-not passed (zero)
(b) probe the CAM for the SV i.e. search for 193.5.4.0 in bin 24 of CAM Table
(c) no match found—since no match on priority prefix found perform symmetrical search on remaining portion of prefix list (i.e. 22 23)
CAM PROBE 2
(a) the next search based on symmetrical binary search is prefix /23
(b) mask the ids with prefix /23 and append with prefix /23 to obtain a search value (SV) for the cam
SV=prefix&IDA•prefix mask
IDA=193.5.4.0, prefix=/23, prefix mask=255.255.254.0
SV=193.5.4.0/23
Masking Process
n1,n2-passed (no change)
n4-not passed (zero)
n3 masked with 254
4=[00000100]
254=[11111110]
n3 masked=[00000100]=4
(c) probe the cam for the SV i.e. search for 193.5.4.0 in bin 23 of cam table
(d) no match found at prefix /23—continue search
CAM PROBE 3
(a) the next search based on the symmetrical approach is prefix /22
(b) mask the IDS with prefix /22 and append with prefix /22 to obtain a search value (SV) for the CAM
SV=prefix&IDA•prefix mask
IDA=193.5.4.0, prefix=/22, prefix mask=255.255.252.0
SV=193.5.4.0/22
Masking Process
n1,n2-passed (no change)
n4-not passed (zero)
n3 masked with 252
4=[00000100]
252=[11111100]
n3 masked=[00000100]=4
(c) probe the cam for the SV i.e. search for 193.5.4.0 in bin 22 of cam table
(d) match found at prefix /22—search ends since /22 is the lowest prefix level in the prefix list that returned a match from the cam
(e) longest matching prefix: 193.5.4.0

I claim:

1. An apparatus for performing an address lookup to find a longest matching prefix for an N-bit input address in a packet data communication system, comprising:
 a memory for storing a table containing a predefined portion of an N-bit address with an associated prefix search list containing prefix values that are candidates for the longest matching prefix;
 an algorithm for selecting a specific prefix value in the prefix search list to structure the N-bit input address to form a search value; and
 a search algorithm for performing an associative comparison of the search value to address entries in a table having the specific prefix value.

2. The apparatus of claim 1, wherein the predefined portion is the first N/2-bit portion of the N-bit address.

3. The apparatus of claim 1, wherein the memory is a lookup table implemented in random access memory.

4. The apparatus of claim 1, wherein the search algorithm is implemented in a content addressable memory containing a table of addresses with associated prefix values.

5. The apparatus of claim 1, wherein the prefix search list includes a portion for representing the prefix value having an initial longest matching prefix.

6. The apparatus of claim 5, wherein the prefix search list includes means for designating one of the prefix values in the prefix search list a priority prefix.

7. The apparatus of claim 6, wherein the algorithm is directed to select the priority prefix as the selected prefix value.

8. The apparatus of claim 5, wherein the algorithm is directed to select a midpoint prefix value for the prefix search list as the selected prefix value.

9. The apparatus of claim 1, wherein the search algorithm is implemented in a content addressable memory containing a table of addresses with associated prefix values.

10. The apparatus of claim 1, wherein x=2.

11. An apparatus for performing a longest matching prefix search of a network address for an N-bit input address in a packet data communication system, comprising:
 a memory for storing a table containing an N/x-bit portion of an N-bit address with an associated prefix search list containing prefix values that are candidates for the longest matching prefix, wherein each of said prefix values represent at least one possible network address match to the N-bit input address;
 a binary search algorithm for selecting a specific prefix value in the prefix search list to mask the N-bit input address to form a search value; and
 a search algorithm for performing an associative comparison of the search value to address entries in a table having the specific prefix value, where 0<x<N.

12. The apparatus of claim 11, wherein the memory is a lookup table implemented in random access memory.

13. The apparatus of claim 11, wherein the prefix search list includes a portion for representing the prefix value having an initial longest matching prefix.

14. The apparatus of claim 13, wherein the prefix search list includes means for designating one of the prefix values in the prefix search list a priority prefix.

15. The apparatus of claim 14, wherein the means for designating is a algorithm for determining a prefix value that is associated with more of the possible network addresses than the sum total of the possible network addresses of the other prefix values in the prefix search list.

16. The apparatus of claim 15, wherein the algorithm is directed to select the priority prefix in the prefix search list as the selected prefix value.

17. A method of performing an address lookup to find a longest matching prefix for an N-bit input address in a packet data communication system, comprising:
 (a) storing a table containing a predefined portion of an N-bit address with an associated prefix search list containing prefix values that are candidates for the longest matching prefix;
 (b) selecting a target prefix value in the prefix search list to structure the N-bit input address to form a search value; and (c) performing an associative comparison of the search value to address entries in a table having the target prefix value.

18. The method of claim 17, wherein the predefined portion is the first N/2-bit portion of the N-bit address.

19. The method of claim 18, wherein the step of storing a table is implemented as a N/2-bit binary decoding tree.

20. The method of claim 19, wherein the prefix search list includes a portion for representing the prefix value having an initial longest matching prefix.

21. The method of claim 20, wherein the prefix search list includes means for designating one of the prefix values in the prefix search list a priority prefix.

22. The method of claim 21, wherein the step of selecting is directed to select the priority prefix as the selected prefix value.

23. The method of claim 17, wherein the step of selecting is directed to select a mid-point prefix value from the prefix search list as the selected prefix value.

24. The method of claim 17, wherein the step of performing the associative comparison is implemented in a content addressable memory containing the table of addresses with associated prefix values.

25. The method of claim 17, wherein steps (b) and (c) are performed until the longest matching prefix is found from the prefix search list.

26. The method of claim 17, wherein steps (b) and (c) are performed until the prefix search list is exhausted.

* * * * *